United States Patent Office 3,035,791
Patented May 22, 1962

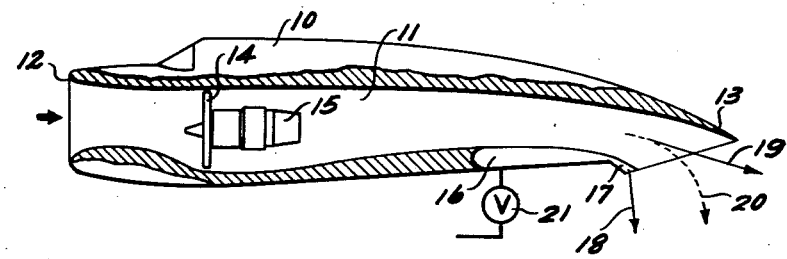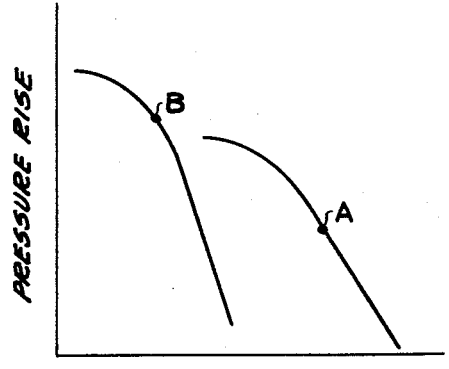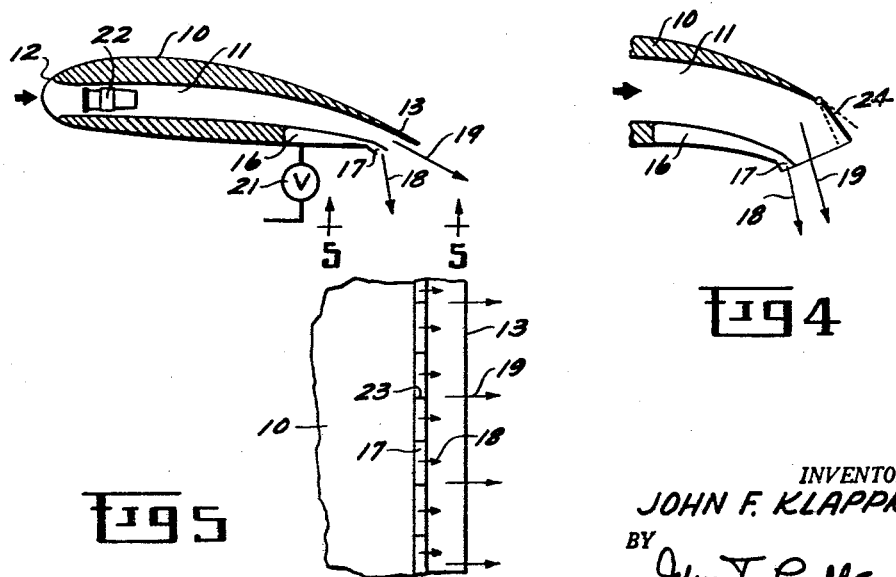

3,035,791
FLOW DIVERTING MECHANISM
John F. Klapproth, Cincinnati, Ohio, assignor to General Electric Company, a corporation of New York
Filed Nov. 2, 1959, Ser. No. 850,179
8 Claims. (Cl. 244—12)

The present invention relates to a flow diverting mechanism and, more particularly, to a flow diverting mechanism particularly adapted for and suitable for VTOL and STOL aircraft.

In the vertical take-off and landing—VTOL and short take-off and landing—STOL—aircraft of the present era, one approach is to move large quantities of low pressure air in order to obtain vertical lift. A number of arrangements have been tried, and have proven successful such as large wing or fuselage mounted fans vertically aligned or horizontally fuselage mounted fans in combination with slats or flaps to direct large quantities of low pressure air downward. A second approach is to use a smaller quantity of high pressure air directed rearwardly or downwardly depending on the direction of motion. A common means of doing this is to use a conventional jet engine and to tilt the whole engine or to provide a deflector such as a cascade of louvers in the form of cambered blades which intercept and direct of the air downwardly during vertical lift. Another scheme is to use deflecting valves which are nothing more than two-way valves permitting the air to move rearwardly for horizontal thrust or downwardly for vertical thrust depending on the valve position.

In some installations it is necessary to use separate sources of power for both horizontal and vertical flight since the requirements are considerably different and engine efficiency for one condition is not necessarily efficient for the other. Thus the use of a single powerplant to provide both horizontal and vertical thrust requires compromise not only in powerplant selection and sizing but also through losses associated with the louver or valve form of turning the large quantities of air through high turning angles into the vertical direction.

The advantage of using a fan to move large quantities of low pressure air in an axial direction is that the fan becomes a primary power source for the horizontal flight and it does not require two separate units for both horizontal flight and vertical lift. It is desirable to have a fan for units having relatively low subsonic cruise velocities since the fan is more efficient than the turbojet at the low speeds. Thus, by mounting a fan in the axial direction, it is necessary to accomplish the thrust vectoring downward in some means or other to turn the flow from the horizontal to the vertical in order to use the same powerplant for both purposes. As previously stated, cascade louvers have been used for this purpose but their effectiveness is restricted by the degree to which they can efficiently turn the flow. Normally, any given cascade of louvers can probably turn the flow only about 30 degrees or so efficiently whereas the normal arrangement desired would require vectoring the thrust closer to 60 degrees. The use of louvers then would require a tandem row in order to be effective which arrangement requires additional hardware and complications. In addition, this cascade would be of high camber with closely spaced louvers and would cause considerable drag during cruise operation. It is desired to have some means whereby the flow may be turned to a high degree and turned efficiently, and which at the same time, does not produce any drag during the cruise conditions. In other words, a means is desired to efficiently and structurally turn the flow downward during vertical or nearly vertical lift and to be as completely ineffective as possible with low drag during horizontal or cruise flight. In addition, it is desired to operate the fan supplying the primary air on the most effective portion of the operating characteristic during take off.

Accordingly, it is the main object of the present invention to provide a diverting mechanism for turning the flow of large quantities of air efficiently and with as little mechanical structure as possible.

Another object of the invention is to provide a flow diverting mechanism which does not rely primarily on mechanical hardware to achieve its flow turning function.

A further object of the invention is to provide a flow diverting mechanism which, when used in VTOL or STOL aircraft, is substantially ineffective and out of the way during the cruise conditions for efficient operation.

Another object is to provide such a flow diverting system which has high turning capacity at low loss and is highly efficient without the use of mechanical hardware.

Another object is to provide a mechanism whereby the fan providing the primary air supply can operate at more effective conditions than conventional arrangements which do not lower the back-pressure of the fan.

Briefly stated, my invention provides a flow diverting mechanism which has a body, such as a fuselage or wing, and which has a generally longitudinal passage through it for the passage of air from an intake at the forward end to a nozzle at the lower rear end of the body. The passage is generally aligned to provide a large component of forward thrust by the exit of exhaust gases through the nozzle. A duct of high pressure air is provided within the body and is connected to a slot mechanism closely adjacent the nozzle so that a jet of high pressure fluid is exhausted adjacent the nozzle and at direction closer to the vertical than the nozzle exhaust. This produces an effect by which the high pressure air induces the low pressure air to follow it thus bending it into the vertical direction to provide vertical thrust by both air flows under no forward movement of the body. Means are provided to selectively operate the high pressure fluid discharge so that it may be turned off during horizontal thrust conditions to render it ineffective.

While the specification concludes with claims particularly pointing out and distinctly claiming the subject matter which is regarded as the invention, it is believed the invention will be better understood from the following description taken in connection with the accompanying drawing in which:

FIGURE 1 is a diagrammatic cross-sectional view through a body which may be a fuselage illustrating the invention;

FIGURE 2 is a plot showing the operating characteristics of fans and propellers;

FIGURE 3 is a view similar to FIGURE 1 wherein the body may be visualized as a wing of an aircraft.

FIGURE 4 is a partial cross-sectional view of a modification of FIGURE 3; and,

FIGURE 5 is a partial plan view taken on line 5—5 of FIGURE 3.

It should be appreciated that the flow-diverting mechanism, to be described herein, may have applications other than the particular preferred embodiment illustrated and is useful wherever fluid quantities are required to be diverted efficiently over large angles. However, the invention is particularly applicable to the VTOL and STOL field and it is in this area in which it will be particularly described.

Referring first to FIGURE 1, there is shown a streamlined body 10 which may be thought of as a fuselage of an airplane but may have other applications. As a fuselage, the body is designed to move through the surrounding air in a generally horizontal direction in the normal fashion. To this end, a generally longitudinal passage 11 is provided through the body since it is intended that the body move by jet reaction. Such reaction is provided by the flow of air through passage 11 which air is taken aboard at an inlet 12 preferably directed forward but not limited to a forward direction and exhausted in a generally horizontal direction through an outlet or nozzle 13 which is preferably located on the lower rear surface of the body 10. In order to provide for the flow of air through the passage 11, suitable means, such as fan 14 is disposed in the passage and is driven by a power source such as a gas turbine engine 15. It will be appreciated that the fan 14 moves large quantities of low pressure air through passage 11 to be exhausted in a generally horizontal direction through low pressure ratio nozzle 13.

It can be seen that if the exhaust fluid from nozzle 13 can be efficiently diverted in a vertical direction, that a vertical force may be obtained on body 10. As previously stated, various cascades have previously been provided for this purpose. However, it is desired to avoid the use of mechanical hardware such as cascades because of their inefficiency at high turning angles as well as their presence during the undesired horizontal or cruise condition. In order to accomplish the same purpose, I prefer to turn the exhaust by means of a high pressure jet to provide an aerodynamic boundary which is the equivalent of a mechanical wall with boundary layer control to permit the exhaust to be turned without having any variable geometry and surfaces that must be moved. In order to accomplish this, there is provided within the body 10 a duct 16 which is designed to contain high pressure fluid. Duct 16 may be disposed in the body 10 in any convenient manner and generally will be a tank or manifolding type of structure. To make use of the high pressure fluid in duct 16, there is provided a slot 17, closely adjacent the nozzle 13, which slot is oriented transversely to direct the high pressure fluid closer to a vertical direction as shown by the arrow 18 than the exhaust of the low pressure air as shown by the arrow 19. The presence of the high pressure jet at arrow 18 induces the low pressure air in the direction of arrow 19 to bend and be pulled more into the vertical direction as shown by the dotted arrow 20. Thus during vertical operation, the high pressure fluid is directed out slot 17 to induce the low pressure exhaust fluid into a vertical direction as shown at arrow 20. During the normal or cruise operation, suitable selective control means, such as valve 21, is provided to control the admission of the high pressure fluid to duct 16.

It can be seen that the use of the aerodynamic boundary, as represented by the arrow 18, does not require any mechanical hardware and yet serves the same purpose as a mechanical louver would in turning the low pressure exhaust. This arrangement also permits the use of two separate power systems if desired, in which one system 14—15 may be used for cruise and can be efficiently designed for that purpose. A separate system 16—18 may be provided for the vertical part of the operation and this system may compromise operational efficiency in favor of weight and cost if a small part of the mission is to be vertical lift. It can be seen that this vertical system will augment the thrust from the main system. As a general rule in many of the VTOL systems, the vehicle must be overpowered as far as cruise operation is concerned in order to obtain the lift that is necessary. The structure just described provides an alternate scheme wherein two power sources—one basically designed for cruise—are provided. This cruise system 14—15 is used to the extent that it can be for vertical lift and it is then supplemented with the auxiliary power system 16—18 during vertical operation. The primary advantage is that the main system can be optimized to the cruise condition, i.e., the fan gearing and fan size and other components may be sized to horsepowers which would be in the order of one-third of the horsepower normally required if the same system is used for vertical lift. This is also true of the turbomachinery components. In addition, engine operation at cruise will be much closer to the maximum efficiency condition for the engine rather than at the usually inefficient fractional load condition. Thus, the cruise powerplant may be optimized thermodynamically as well as size and weight wise for cruise requirements and with the use of the auxiliary system mentioned for vertical lift an overall more efficient system is obtained.

Further, the specified combination of fan and thrust vectoring system described permits the main cruise system to provide more lift than would exist if operated separately. For example, if the fan can be made to operate at a high flow-low pressure rise condition, a point A of FIG. 2 (equivalent to the cruise condition), the lifting force available is larger than if the same horsepower is used for low flow, high pressure operation, point B of FIG. 2, (corresponding to conventional take off conditions). A variable pitch is presumed in the example of FIG. 2. Fixed geometry operation would be even less desirable.

Referring next to FIGURE 3, wherein like numerals refer to like parts, a similar arrangement is shown as it might be applied to a wing or airfoil of a typical aircraft. In this embodiment, the longitudinal passage 11 would be provided with a suitable powerplant or powerplants 22 to move large quantities of low pressure air therethrough. The inlet 12 and discharge 13 would preferably be designed to extend spanwise along the wing as much as possible by means of conventional transition sections between the fan and inlet and discharge. The high pressure duct 16 would generally comprise a manifolding extending lengthwise of the wing and buried in a wing as shown. The slots 17 connected with the duct 16 adjacent the nozzle 13 on the upstream edge thereof would extend transversely to the flow of air through the passage or across the wing as shown in FIGURE 5 thus generally parallel to the duct. Suitable structural elements 23 may provide support so that slot 17 is a continuous slot or segmented in order to direct its high pressure jet in the direction of arrow 18 in a substantially continuous sheet. The operation of the wing shown in FIGURE 3 is the same as that described in FIGURE 1 above in that the high pressure jet 18 which acts as an air flap bends the low pressure exhaust 19 into the vertical direction when 18 is activated under the control of valve 21.

Referring next to FIGURE 4, a slight modification is shown wherein an additional flap 24 is provided on the upper surface of the wing or fuselage at the nozzle. It should be apparent that the flap 24 is intended to represent either a mechanical or aerodynamic flap of the type described for the lower surface in connection with FIGURES 1 and 3. Actually, the preferable arrangement would be an extendable mechanical flap of the Fowler type since it would have certain advantages over the jet flap in increasing actual lifting surface of the airfoil or body 10. The operation of the FIGURE 4 modification is identical with that of FIGURES 1 and 3.

Thus, the present invention dispenses with all or part of the mechanical hardware normally associated with the turning of the horizontal flow and substitutes therefor an aerodynamic surface that is completely ineffective in the normal horizontal cruise condition. In addition, it is highly effective and efficient in the vertical position when it is operating to induce the main flow closer to the vertical position, as well as augment the vertical thrust itself. Further, the combination as proposed permits the normal thrust of the cruise system during static condition to be increased over that normally available. In addition, the aerodynamic lift of the primary body (such as a wing) will be increased as a result of the action of the flow through the nozzle in a manner similar to that of the familiar jet flap principle.

While there has been hereinbefore described a preferred form of the invention, obviously many modifications and variations of the present invention are possible in the light of the above teachings. It is therefore to be understood that within the scope of the appended claims, the invention may be practiced otherwise than as specifically described.

I claim:
1. In a streamlined body for movement through the air in a horizontal and vertical direction and having a generally longitudinal passage opening forward and terminating in a nozzle at the downstream end thereof and means in said passage for moving low pressure air therethrough and out said nozzle for propulsive thrust, flow diverting mechanism comprising, a duct in said body, slot means connected to said duct to be fed thereby, said slot being oriented to discharge fluid closer to a vertical direction than said nozzle and disposed transverse to the direction of propulsive thrust, said slot being disposed in the lower surface of said body adjacent said nozzle, and a high pressure fluid in said duct whereby the low pressure air through said nozzle is induced downward toward the vertical by the high pressure fluid discharged through said slot means to provide a vertical thrust by said pressure fluid and air under no horizontal movement of the body.

2. Apparatus as described in claim 1 having control means to selectively admit fluid to said duct.

3. Apparatus as described in claim 1 having flap means on the upper surface of said body adjacent said nozzle.

4. In an airfoil shaped body for movement through the air in a horizontal and vertical direction and having a generally longitudinal passage therethrough terminating in a nozzle on the lower rear surface of the airfoil and means in said passage for moving low pressure air therethrough and out said nozzle for propulsive thrust, flow diverting mechanism comprising, a duct in said body generally transverse to said passage air flow, a slot in the lower surface of said airfoil adjacent said nozzle on the upstream side thereof, said slot being oriented to discharge high pressure fluid closer to a vertical direction than said nozzle and being generally parallel to said duct, and a high pressure fluid in said duct whereby the low pressure air through said nozzle is induced downward toward the vertical by the high pressure fluid discharged through said slot to provide a vertical thrust by said pressure fluid and air under no horizontal movement of the body.

5. Apparatus as described in claim 4 having valve control means to selectively admit fluid to said duct.

6. Apparatus as described in claim 4 having flap means on the upper surface of said airfoil adjacent said nozzle.

7. In a VTO aircraft having a fuselage with a generally longitudinal airflow passage therethrough with a forward opening and a nozzle on the lower rear surface of the fuselage and having means in said passage for moving low pressure air therethrough and out said nozzle for forward propulsive thrust, flow diverting mechanism comprising, means in said fuselage for selectively discharging a flap of high pressure fluid adjacent said nozzle on the upstream lower side thereof in a direction closer to the vertical than said nozzle discharge direction, whereby the low pressure air is induced downward toward the vertical by the high pressure fluid to provide vertical thrust to said fuselage.

8. Apparatus as described in claim 7 wherein a wing is substituted for said fuselage and the nozzle is a continuous slot on the lower rear wing surface.

References Cited in the file of this patent
UNITED STATES PATENTS

| | | |
|---|---|---|
| 2,396,911 | Anxionnaz | Mar. 19, 1946 |
| 2,461,435 | Neuman et al. | Feb. 8, 1949 |
| 2,486,967 | Morrisson | Nov. 11, 1949 |
| 2,793,493 | Kadosch et al. | May 28, 1957 |
| 2,922,277 | Bertin | Jan. 26, 1960 |
| 2,961,192 | Davidson | Nov. 22, 1960 |
| 2,968,921 | David | Jan. 24, 1961 |

FOREIGN PATENTS

| | | |
|---|---|---|
| 1,155,513 | France | Dec. 2, 1957 |